United States Patent [19]

Katsuta et al.

[11] 3,911,727
[45] Oct. 14, 1975

[54] THERMAL LEAK DETECTOR FOR A HEAT-INSULATION-LINED TANK FOR LOW-TEMPERATURE LIQUIDS

[75] Inventors: Kihei Katsuta; Nobuya Watanabe, both of Nagasaki; Chiaki Matsuyama, Tokyo, all of Japan

[73] Assignee: Mitsubishi Jukogyo Kabushiki Kaisha, Tokyo, Japan

[22] Filed: Feb. 25, 1974

[21] Appl. No.: 445,217

[30] Foreign Application Priority Data

| Mar. 2, 1973 | Japan | 48-25298 |
| Mar. 3, 1973 | Japan | 48-25444 |
| Mar. 28, 1973 | Japan | 48-35296 |

[52] U.S. Cl. .............. 73/49.2; 73/340; 73/343 R
[51] Int. Cl.² ............ G01M 3/00; G01K 7/00; G01N 25/18
[58] Field of Search ........ 73/40, 40.5 R, 49.2, 49.3, 73/340, 342, 343 R, 344, 362 CP

[56] References Cited
UNITED STATES PATENTS

| 3,214,963 | 11/1965 | Schlumberger et al. | 73/49.2 |
| 3,280,620 | 10/1966 | Anderson | 73/40.5 R |
| 3,375,702 | 4/1968 | Birman | 73/340 X |
| 3,413,840 | 12/1968 | Basile et al. | 73/40 |
| 3,614,893 | 10/1971 | Nesbitt et al. | 73/362 R |
| 3,699,810 | 10/1972 | Takahashi | 73/342 X |

Primary Examiner—Richard C. Queisser
Assistant Examiner—Frederick Shoon
Attorney, Agent, or Firm—Toren, McGeady and Stanger

[57] ABSTRACT

This invention relates to a heat-insulation-lined storage tank for low-temperature liquids having a liquid-impervious layer secured on the inside of the tank shell through a heat-insulation layer. The tank of this invention has a second barrier impervious to liquids inside the heat-insulation layer and temperature-sensing members for electrically or electromagnetically detecting low temperatures inside or along the second barrier, thereby providing a storage tank for low-temperature liquids capable of detecting breaks of the liquid-impervious layer. The members for electrically or electromagnetically detecting low temperatures may be thermocouples, resistors for temperature measurement, temperature-sensing magnetic substances, and coil temperature-sensing magnetic substances.

9 Claims, 11 Drawing Figures (a)

(b)

THERMAL LEAK DETECTOR FOR A HEAT-INSULATION-LINED TANK FOR LOW-TEMPERATURE LIQUIDS

This invention relates to a storage tank for low-temperature liquids having a leak detecting device.

In a so-called heat-insulation-lined storage tank for low-temperature liquid having a liquid-impervious layer on the inside of the tank shell through a heat-insulation layer, if any leak of a low-temperature liquid occurs due to a break of the liquid-impervious layer in contact with the low-temperature liquid, the tank shell adjacent to the leak point will be violently cooled and may consequently be subject to rupture from brittleness at a low temperature.

Or even in case the degree of such a leak of the tank shell is not so great as to cause rupture from brittleness at low temperature, a liquefied gas, which may have leaked into the inside of the heat-insulation layer, will keep the inside of said layer in explosive atmosphere even after the tank has been emptied and may lead to a great accident.

In the case of a heat-insulation-lined storage tank for low-temperature liquids, therefore, it is necessary to detect a break of the heat-insulation layer without delay and to stop the leak of the stored liquid halfway on the heat-insulation layer for a fixed period of time in order to protect the tank against a rupture accident.

As the art of a heat-insulation-lined storage tank for low-temperature liquids is one which has come to attract attention only recently, no art for protecting it against accidents has yet been established.

It is an object of the present invention to provide a device for the sure and quick detection of a liquid or gas leak to be caused by a break of the liquid-impervious layer so that the possible rupture of the tank shell due to the leak of a low-temperature liquid can be prevented from occurring.

It is another object of the invention to provide a heat-insulation-lined storage tank for low-temperature liquids composed in such a manner that any permeation of the stored liquid can be prevented temporarily by a liquid-impervious second barrier fitted inside of the heat-insulation layer and that any leak of the low-temperature liquid or evaporated gas can be detected electrically or electomagnetically by the temperature-sensing members arranged along the second barrier.

It is another object of the invention to provide a heat-insulation-lined storage tank for low-temperature liquids composed in such a manner that not only can a leak of the low-temperature liquid into the inside of the heat-insulation layer be detected but also the point of occurrence of such a leak.

It is yet another object of this invention to provide a storage equipment for low-temperature liquids which can accomplish all aforementioned objects and yet permit easy manufacture, assembly and execution.

In order to realize these objects, the low-temperature-liquid storage tank according to this invention is characterized by arranging temperature-sensing members along the second barrier for electrically or electro-magnetically detecting a leak of a low-temperature liquid in a low-temperature-liquid storage tank having a liquid-impervious layer on the inside of the tank shell through a heat-insulation layer and also a second barrier inside of the heat-insulation layer.

In the tank of this invention, if the low-temperature liquid begins to leak due to a break of the innermost liquid-impervious layer, this leaking liquid will be checked temporarily by the second barrier fitted inside of the heat-insulation layer, and at the same time those of the temperature-sensing members along the second barrier which pass the leak point will be cooled by the low-temperature leaking liquid and undergo an electrical or electromagnetic change, thus enabling quick discovery of the leak point.

After the leak point has been thus discovered, the tank shell can be prevented from rupture due to low-temperature brittleness by taking some measure, such as lowering the low-temperature liquid level in the tank temporarily below the leak point.

Combinations of temperature-sensing magnetic substances and coils, thermocouples, temperature-measuring resistors and core-shaped magnetic materials which are demagnetized at a specified temperature can be used as the temperature-sensing members. These temperature-sensing members are either embedded in or arranged along the second barrier inside of the heat-insulation layer.

In the case where temperature-sensing magnetic substances are adopted as the temperature-sensing members, when the low-temperature liquid leaks to cool the temperature-sensing magnetic substances, the magnetism of said magnetic substances are varied to change the impedance of the coils, thus enabling the discovery of the leak of the low-temperature liquid by detecting the change in the impedance by means of an A.C. ammeter or the like.

In the case where thermocouples or temperature-measuring resistors are used as the temperature-sensing members, the electromotive force of the thermocouples or the value of resistance of the temperature-measuring resistors is changed by the cooling of the leaking liquid, thus enabling the discovery of the leak of the low-temperature liquid in the same way as the above.

Again, in the case where core-shaped magnetic materials which are demagnetized at temperatures below a specified temperature are employed as the temperature-sensing members, the core-shaped magnetic materials are demagnetized by the cooling of the leaking liquid, thus enabling the discovery of the leak from this change in magnetism.

It is further possible to detect the point of leak of the low-temperature liquid by adopting a classified arrangement of these different temperature-sensing members.

In the case of the core-shaped magnetic substances in particular, the leak point can be detected faster with the aid of a mini-computer by arranging conductors crosswise in a netted pattern along the second barrier and connecting the core-shaped magnetic substances to the respective intersections thereof. In this case, the conductors arranged crosswise in a netted pattern can also have the function of a crack barrier to reinforce the second barrier and prevent the growth of a crack which may occur therein.

The above and other objects, advantages, and features of the invention will become apparent from the following description taken in conjunction with the accompanying drawings showing embodiments thereof.

Figure 4:
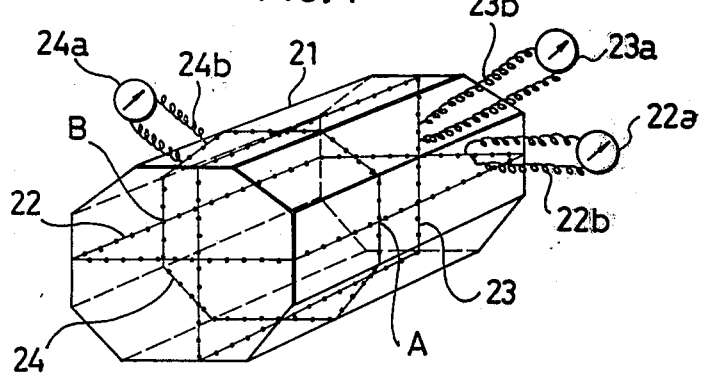
FIG. 4 is a perspective view of a tank according to another embodiment of the invention.
Figure 5:
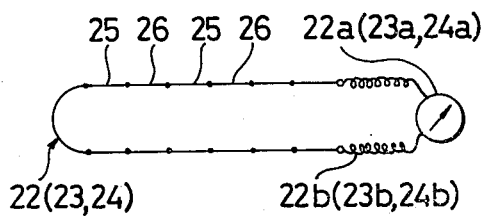
Figure 5:
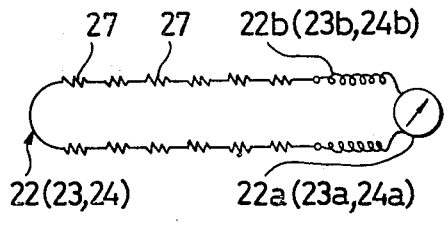
Figure 6:
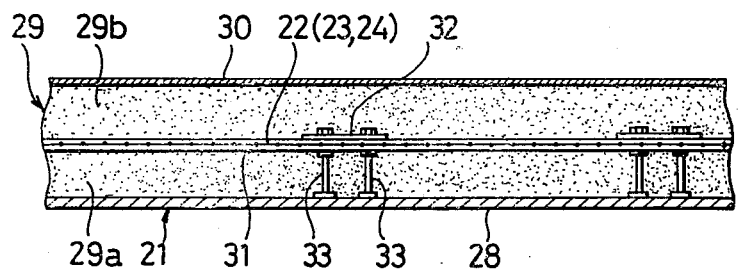
Figure 7:
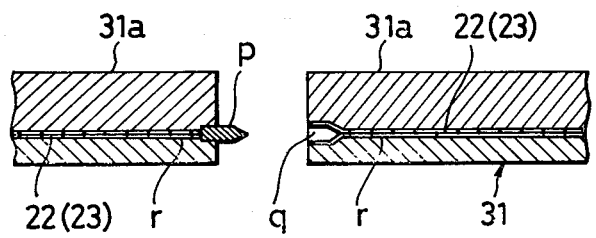
Figure 8:
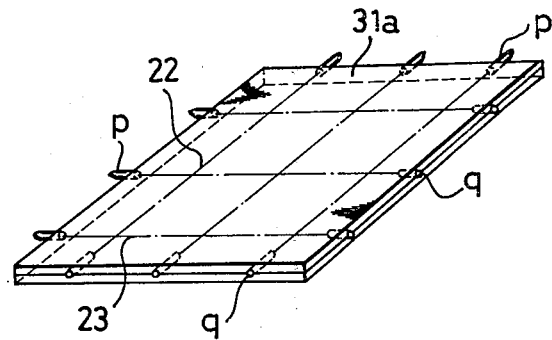
Figure 9:
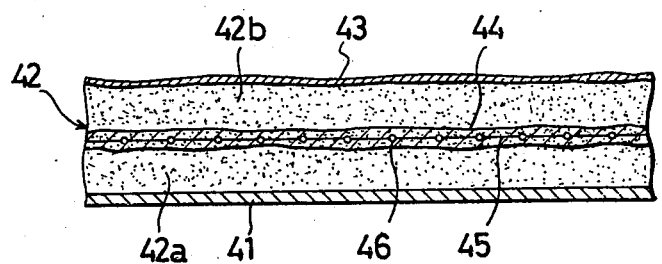
Figure 10:
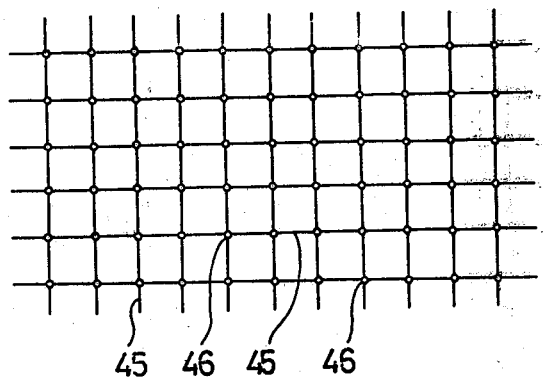

FIG. 5 (a) and (b) are views illustrating the leak detection loop in the tank shown in FIG. 4;

FIG. 6 is a fragmentary sectional view of the tank wall having the loop;

FIG. 7 is a sectional view illustrating the procedure for assembling the second barrier on the tank wall having the loop;

FIG. 8 is a perspective view of a panel member as an assembled unit of the second barrier;

FIG. 9 is a sectional view of the wall of a low-temperature-liquid storage tank according to yet another embodiment of the invention; and FIG. 10 is a front view of the conductors arranged crosswise in a netted pattern and having the core-shaped magnetic substances to be embedded in the tank wall.

Figure 1:
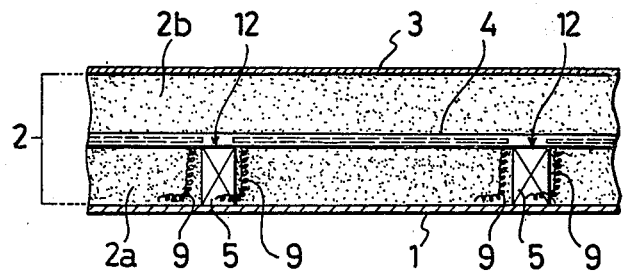
FIG. 1 is a fragmentary sectional view of the wall of a low-temperature-liquid storage tank having temperature-sensing substances and coils as temperature-sensing members for leak detection as an embodiment of the invention.
Figure 2:
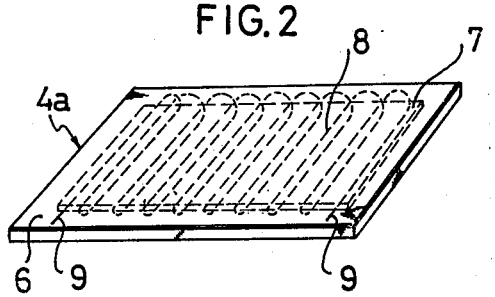
FIG. 2 is a perspective view of a panel composing the second barrier on the wall of said tank.
Figure 3:
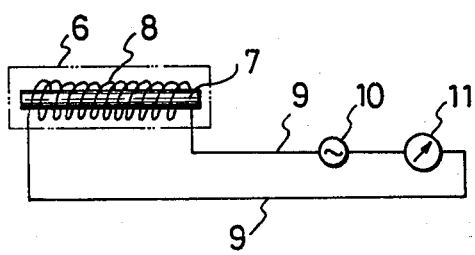
FIG. 3 is a view of the electric circuit of the device for leak detection in the tank of the invention.

With reference to FIGS. 1 to 3, the first embodiment of the invention will now be described. In FIG. 1 there is shown a wall portion of a tank for storing a low-temperature liquefied natural gas at a temperature of about −160°. The steel tank shell 1 is provided on its inside with the liquid-impervious layer 3 made of a low-temperature-resistant material by way of the heat-insulation layer 2, for example, of foamed plastics.

The heat-insulation layer 2 consists of the first heat-insulation layer portion 2a on the room-temperature side and the second heat-insulation layer portion 2b on the low-temperature side. Between these heat-insulation layer portions 2a and 2b is arranged the second barrier 4, which is fixed at some intervals on the inside of the tank shell 1 by way of the spacers 5.

FIG. 2 is a perspective view illustrating the details of one of the plurality of panels composing the second barrier 4. The panel 4a proper is formed of the impervious plastic layer 6, inside of which is arranged the temperature-sensing member for leak detection composed of the temperature-sensing magnetic substance 7 and the coil 8 wound thereon.

Tetrafluoroethylene plastics or the like as the material of the impervious plastic layer 6 is used having excellent electric insulation and low-temperature resistance.

A plurality of the panels 4a shown in FIG. 2 are bonded in liquid-tight manner to one another at their edges, thereby forming the second barrier 4 as shown in FIG. 1. The symbol 12 in FIG. 1 represents the mutually bonded portion of the panels.

To the coils 8 is connected the lead wire 9 for leak detection, which is liquidtightly led to the outside of the tank shell 1 and connected to the A.C. power source 10 and the ammeter 11 as shown in FIG. 3.

FIG. 3 illustrates the electric circuit for leak detection consisting of the temperature-sensing magnetic substance 7, the coil 8, both embedded in the plastic layer 6, the A.C. power source 10 and the ammeter 11 connected to said coil 8 through the leak wire 9. A plurality of such electric circuits for leak detection are provided mutually independently and arranged in such a manner that they can cover the whole surface of the tank.

Since the leak detecting device in the tank is composed as described above, if a break has occurred to the liquid-impervious layer 3 on the innermost side of the low-temperature-liquid storage tank, the low-temperature liquefied natural gas or the evaporated gas thereof in the tank will leak and penetrate the second heat-insulation layer portion 2b but this leaking fluid will temporarily be checked by the impervious plastic layer 6 of the second barrier 4.

The temperature-sensing magnetic substance 7 of the electric circuit for leak detection at this leak point will lose its magnetism by being cooled by the low-temperature leaking fluid. Then the impedance of the coil 8 will thereby be changed and the change will be indicated on the ammeter 11.

When the leak point of the tank is thus detected from a change in the value indicated by the ammeter 11, the tank shell 1 can be prevented from rupture due to low-temperature brittleness by taking some measure, such as lowering the low-temperature liquid level in the tank temporarily below the leak point.

In the leak detecting device of this low-temperature-liquid storage tank, the electrical leak detector consisting of the temperature-sensing magnetic substances 7 and the coils 8 is formed in the second barrier in the tank wall portion. This has the advantage of permitting quick and accurate leak detection whether the leaking fluid is a low-temperature liquid or the evaporated gas thereof.

Moreover, the use of a thermoplastic material as the material of the plastic layer 6 in the second barrier 4 can facilitate the mutual bonding of the panels 4a as said material permits welding.

The panels 4a are reinforced with coils 8 but may be additionally strengthed by embedding glass fibers or the like in the plastic layer 6.

The second embodiment of the invention will be described hereunder in connection with FIGS. 4 to 8.

FIG. 4 shows a perspective view illustrating an outline of a multiangular low-temperature-liquid storage tank having a leak detecting device and mounted on a ship. In the wall portion of this tank 21 are embedded the horizontal loop 22, the longitudinally splitting vertical loop 23, and the transversally splitting vertical loop 24 for electrically detecting a leak of the low-temperature liquid in the tank.

Although only single loops 22, 23, and 24 are represented by FIG. 4, there are actually embedded in said wall portion groups of horizontal loops, longitudinally-splitting vertical loops, and transversally splitting vertical loops each consisting of a plurality of loops and being independent from one another.

To the respective loops 22, 23, and 24 are connected, through the lead wires 22b, 23b, and 24b, the meters 22a, 23a, and 24a for indicating the electrical changes in case the loops are cooled by the low-temperature leaking liquid, said meters 22a, 23a, and 24a being observable from the outside of the tank.

As the loops 22, 23, and 24, a plurality of thermocouples composed of chromel 25 and alumel 26 and connected in series as shown in FIG. 5 (a) or a plurality of temperature-measuring resistors 27 connected in series as shown in FIG. 5 (b) are employed.

The meters 22a (23a and 24a) in the case of FIG. 5 (a) are voltmeters whereas the meters 22a (23a and 24a) in the case of FIG. 5 (b) are electric resistance meters.

FIG. 6 illustrates a section of the tank 21 having the heat-insulation layer 29 of plastic foam or the like on the inside of the rigid tank shell 28 of steel, said heat-insulation layer 29 being lined on its inside with the liquid-impervious second barrier 30 of a low-temperature-resistant material.

The heat-insulation layer 29 is composed of the 1st heat-insulation layer portion 29a and the second heat-insulation layer portion 29b, and the panel layer 31 is bonded between these heat-insulation layer portions 29a and 29b to serve as the second barrier.

Along the panel layer 31 are provided the leak-detecting loops 22 (23 and 24).

FIG. 7 is a sectional view illustrating the procedure for assembling the panel layer 31, and FIG. 8 is a perspective view illustrating the panel member as an assembled unit of the panel layer 31. The panel member 31a in which the loops 22 and 23 are partly embedded as shown in FIG. 8 is bonded with an adhesive in such a manner that the loops 22 and 23 can be connected through the plug p and the socket q as shown in FIG. 7. The symbol r in FIG. 7 represents the terminal to be used for connecting the lead wire to the aforementioned meters.

The panel layer 31 thus assembled is fitted to the inside of the tank shell 28 through the joint plate 32 and the bolt 33 as shown in FIG. 6. Into the space between the tank shell 28 and the panel layer 31 is injected an expandable resin solution so that the first heat-insulation layer portion 29 can be formed.

If a polyurethane resin is used as the material of the plastic foam to compose this first heat-insulation layer portion 29a, a heat-insulation layer firmly bonded to the tank shell 28 and the panel layer 31 can result.

The second heat-insulation layer portion 29b is formed either by spraying an expandable resin solution over the surface of panel layer 31 or by injecting an expandable resin solution into the space between the panel layer 31 and the liquid-impervious layer 30.

If a break has occurred to the liquid-impervious layer 30 on the innermost side of the low-temperature-liquid storage tank composed as stated above, the low-temperature liquid will leak and penetrate the second heat-insulation layer portion 29b but this leaking liquid will be checked temporarily by the panel layer 31 which serves as the second barrier. The leak-detecting loops 22, 23, and 24 adjacent to this leak point will then be cooled by the low-temperature liquid and the electrical change will be indicated on the corresponding meters 22a, 23a, and 24a.

In the tank 21 of FIG. 4, for example, when the liquid-impervious layer at the point shown by symbol A has broken to cause the low-temperature liquid to leak, this leak is detected by the meter 22a of the horizontal loop 22 and the height of the leak point is thereby clarified, so that the leak can be stopped by lowering the level of the low-temperature liquid in the tank temporarily below said height of the leak point.

In the case of the above leak, the meter 24a of the longitudinally splitting vertical loop 24 also indicates the leak so that the leak point can be found to exist at point A or B where both loops 22 and 24 intersect. This greatly facilitates the discovery of the leak point, if judged at the same time from the cold spot phenomenon in the tank shell 28.

In the leak-detecting device of the low-temperature-liquid storage tank according to this invention, any leak of the low-temperature liquid can be detected easily by the very simple structure which permits employment of electrical detection means by utilizing the panel layer 31 as the second barrier in the tank wall portion. The discovery of the leak point is further facilitated by the fact that said detection means are embedded in the tank wall portion as a plurality of leak-detecting loops running in all directions.

The third embodiment of the invention will be described hereunder in connection with FIGS. 9 and 10.

As shown in FIG. 9, the rigid tank shell 41 of steel has the heat-insulation layer 42 of plastic foam or the like on its inside, said heat-insulation layer being lined with the liquid-impervious second barrier of a low-temperature-resistant material on its inside.

The heat-insulation layer 42 is composed of the 1st heat-insulation layer portion 42a and the 2nd heat-insulation layer portion 42b, and between these heat-insulation layer portions 42a and 42b there is the electric insulation layer 44 like an epoxy resin layer having functions as the second barrier.

Along this electric insulation layer 44 are the conductors 45 arranged crosswise in a netted pattern so as to reinforce the layer 44.

To the respective intersections of the conductors 45 arranged in a netted pattern are connected the core-shaped magnetic substances 46, as shown in FIG. 10.

To fabricate the tank wall portion as described above, first the 1st heat-insulation layer portion 42a having a specified thickness is formed by spraying and foaming an expandable polyurethane solution or the like for a required number of times over the inside surface of the tank shell 41 shown in FIG. 10, then the conductors 45 with the core-shaped magnetic substances 46 connected thereto as shown in FIG. 9 are arranged on the inside surface of said first heat-insulation layer portion 42a, and finally a non-expandable epoxy or polyurethane resin solution is sprayed over said surface of the first heat-insulation layer portion 42a.

Thus on the inside surface of the first heat-insulation layer portion 42a is formed the fixed electric insulation layer 44 as a plastic layer having the embedded conductors 45 to which the core-shaped magnetic substances are connected. This electric insulation layer 44 may be further reinforced with glass fibers or the like.

It is also possible to form the electric insulation layer 44 as the 2nd barrier by smooth-finishing the inside surface of the first heat-insulation layer portion 42a formed in the aforesaid manner and fitting a plastic board to this smooth surface, said plastic board having the netted conductors 45 embedded therein and said conductors being connected to the core-shaped magnetic substances 45.

The 2nd heat-insulation layer portion 42b on the low-temperature side can be formed by spraying an expandable resin solution on the inside surface of the electric insulation layer 44. As anti-low-temperature strength is required of this second heat-insulation layer portion 42b, the use of a cut-fiber-reinforced foam is recommended.

On the further inside of the second heat-insulation layer portion 42b thus formed is secured the liquid-impervious layer 43 composed of a low-temperature-resistant material.

In the low-temperature-liquid storage tank composed in the aforesaid manner, when a break has occurred to the liquid-impervious layer 43 on the innermost side, the low-temperature liquid leaks and penetrates the second heat-insulation layer portion 42 but this leaking liquid is checked temporarily by the electric insulation layer 44 serving as the second barrier.

The core-shaped magnetic substance 46 at a point adjacent to the leak point is then cooled by the low-temperature leaking liquid and demagnetized, and the electrical change caused thereby is indicated on the meter (not shown) connected to the conductor 45.

In case the electric insulation layer 44 is formed just in the middle of the heat-insulation layer 42, and suppose the low-temperature liquid is a liquefied natural gas at $-162°$ and the temperature of the tank shell 41 is $20°$, the average temperature of $-90°$ is the normal temperature. Therefore, it is suitable to select a temperature of about $-130°$ as the demagnetizing temperature for the core-shaped magnetic substances 46. In case, however, the exact positions at which the respective core-shaped magnetic substances 46 are arranged and the exact temperatures at which they can be demagnetized are clear, it is not necessarily important to equalize the demagnetizing tempertures for all core-shaped magnetic substances 46.

Even in case the number of core-shaped magnetic substances 46 is increased, the position of the demagnetized core-shaped magnetic substance 46, that is the leak point, can be detected quickly by the utilization of a mini-computer.

When the leak point is thus detected and its height thus clarified, the leak can be stopped temporarily by lowering the level of the low-temperature liquid in the tank below said height.

In the leak-detecting device of the aforesaid low-temperature-liquid storage tank, any leak of the low-temperature liquid can be detected easily and quickly by the very simple structure which permits employment of electrical detection means by utilizing the second barrier interposed between the portions of the heat-insulation layer in the tank wall portion, and furthermore there is the advantage that the discovery of the leak point is made remarkably easy and accurate because the leak is detected by utilizing the demagnetization, by cooling, of the core-shaped magnetic substances 56 connected and arranged to the respective intersections of the netted conductors 45.

Also in this storage equipment, there is the additional advantage that the electric insulation layer 44 serving as the second barrier is reinforced by the netted conductors 45 so that the heat-insulation layer can be protected against cracking.

What is claimed is:

1. A storage tank for low-temperature liquids comprising:
   a tank shell;
   a liquid-impervious layer secured on the inside of the tank shell;
   a heat-insulation layer being provided between said tank shell and said liquid-impervious layer;
   a fluid-tight barrier portion being provided within said heat-insulation layer, said barrier portion including an electric insulation layer and temperature sensing members embedded in said layer, said temperature sensing members being interconnected by electrical conductors so as to form a lattice network; and
   indicating means connected to a plurality of lattice intersections and responsive to a change in an electrical circuit parameter for indicating local temperature as a result of a leak in said liquid-impervious layer.

2. A tank as in claim 1 wherein a plurality of loops are formed by interconnection of conductors set up in boards adjoining one another, each loop comprising many temperature-sensing members connected in series.

3. A tank as in claim 1 wherein said temperature sensing members include magnetic substances having temperature sensitive properties and coil elements disposed around said substances.

4. A tank as in claim 1 wherein said temperature-sensing members are thermocouple elements.

5. A tank as in claim 1 wherein said temperature-sensing members are temperature measuring resistors.

6. A tank as in claim 1 wherein said temperature-sensing members comprise core-shaped magnetic substances.

7. The storage tank of claim 1 wherein said electrical conductors are arranged in closed loops, and interconnecting a plurality of temperature sensors in series, said loops forming a three-dimensional intersecting lattice.

8. A tank as in claim 1 wherein said barrier portion is composed of panel-shaped boards bonded to one another at their mutually adjoining edges.

9. An arrangement for detection of a local low temperature condition in a closed three-dimensional structure comprising an inner surface of said structure having a substantially uniform temperature; a network of closed loops surrounding said inner surface forming a three-dimensional intersecting lattice, each loop comprising a plurality of temperature sensing members being interconnected by electrical conductors; and indicating means being connected to each of said loops and responsive to a change in an electrical parameter of said loop resulting from an electrical change of said temperature sensing members for indicating a lower temperature of said surface and for providing identification of the position of said lower temperature with respect to said network.

* * * * *